United States Patent
Steiner et al.

(10) Patent No.: US 11,435,106 B2
(45) Date of Patent: Sep. 6, 2022

(54) METHOD AND A MOBILE COMMUNICATION DEVICE FOR CONTROLLING AN HVAC COMPONENT IN A BUILDING

(71) Applicant: BELIMO HOLDING AG, Hinwil (CH)

(72) Inventors: Marc Steiner, Einsiedeln (CH); Silvio Grogg, Wetzikon (CH); Marc Thuillard, Uetikon am See (CH)

(73) Assignee: BELIMO HOLDING AG, Hinwil (CH)

( * ) Notice: Subject to any disclaimer, the term of this patent is extended or adjusted under 35 U.S.C. 154(b) by 0 days.

(21) Appl. No.: 17/054,707

(22) PCT Filed: May 20, 2019

(86) PCT No.: PCT/EP2019/062977
§ 371 (c)(1),
(2) Date: Nov. 11, 2020

(87) PCT Pub. No.: WO2019/228841
PCT Pub. Date: Dec. 5, 2019

(65) Prior Publication Data
US 2021/0071896 A1    Mar. 11, 2021

(30) Foreign Application Priority Data

May 29, 2018   (CH) ..................................... 00683/18

(51) Int. Cl.
*F24F 11/58*   (2018.01)
*F24F 11/52*   (2018.01)
(Continued)

(52) U.S. Cl.
CPC .............. *F24F 11/58* (2018.01); *F24F 11/52* (2018.01); *G06T 19/006* (2013.01); *G08C 17/02* (2013.01);
(Continued)

(58) Field of Classification Search
CPC . F24F 11/58; F24F 11/52; F24F 11/56; G06T 19/006; G08C 17/02; G08C 2201/30; G08C 2201/93; G08C 17/00
See application file for complete search history.

(56) References Cited

U.S. PATENT DOCUMENTS 8,000,727 B1 * 8/2011 Bushman ................ H04L 63/18
455/456.5
8,769,030 B2 * 7/2014 Heninwolf ............ H04L 12/282
709/206
(Continued)

FOREIGN PATENT DOCUMENTS

CN    104102246 A      10/2014
CN    107806691 A   *   3/2018
(Continued)

OTHER PUBLICATIONS

International Search Report for PCT/EP2019/062977 dated Aug. 5, 2019 [PCT/ISA/210].
(Continued)

*Primary Examiner* — Adnan Aziz
(74) *Attorney, Agent, or Firm* — Sughrue Mion, PLLC

(57) ABSTRACT

For controlling an HVAC component (3), a physical identifier object (5) associated with the HVAC component (3) is arranged in an area (41) with access to a wireless network (6) and at a location distant and separated from the HVAC component (3). Identifier information is obtained from the physical identifier object (5) by a mobile communication device (1) and transmitted via the wireless network (6) to a
(Continued)

remote computer system (2). The remote computer system (2) returns HVAC component data linked to the identifier information. The mobile communication device (1) uses the component data for generating a user interface (100) for an HVAC virtual room unit for controlling the HVAC component (3). User commands received via the user interface (100) are transmitted by the mobile communication device (1) via the remote computer system (2) to the HVAC component (3) for controlling the HVAC component (3).

14 Claims, 5 Drawing Sheets

(51) Int. Cl.
    *G08C 17/02*         (2006.01)
    *G06T 19/00*         (2011.01)

(52) U.S. Cl.
    CPC ..... *G08C 2201/30* (2013.01); *G08C 2201/93* (2013.01)

(56) References Cited

U.S. PATENT DOCUMENTS

| | | | |
|---|---|---|---|
| 10,078,341 B2* | 9/2018 | Blum | H04W 4/029 |
| 10,613,555 B2* | 4/2020 | Bergman | G05D 23/1927 |
| 10,785,051 B2* | 9/2020 | Kang | H04L 12/2818 |
| 10,921,008 B1* | 2/2021 | Moore | H04L 67/125 |
| 2005/0194456 A1* | 9/2005 | Tessier | F24F 11/30 |
| | | | 236/51 |
| 2010/0261465 A1 | 10/2010 | Rhoads et al. | |
| 2012/0019674 A1* | 1/2012 | Ohnishi | G08C 17/00 |
| | | | 348/207.1 |
| 2014/0064736 A1 | 3/2014 | Manabe | |
| 2014/0156087 A1* | 6/2014 | Amundson | G05B 15/02 |
| | | | 700/278 |
| 2014/0197934 A1* | 7/2014 | Ha | D06F 34/05 |
| | | | 340/12.5 |
| 2014/0227975 A1* | 8/2014 | Kuroyama | G08C 17/02 |
| | | | 455/41.1 |
| 2015/0159895 A1* | 6/2015 | Quam | F21V 23/005 |
| | | | 700/275 |
| 2016/0209060 A1* | 7/2016 | Castillo | H04L 12/2825 |
| 2017/0026779 A1* | 1/2017 | Schmidlin | H04W 4/80 |
| 2017/0089602 A1 | 3/2017 | Lemire et al. | |
| 2017/0180147 A1* | 6/2017 | Brandman | G06Q 40/08 |
| 2018/0058712 A1* | 3/2018 | Miyaura | F24F 11/62 |
| 2018/0158316 A1 | 6/2018 | Ham et al. | |

FOREIGN PATENT DOCUMENTS

| | | |
|---|---|---|
| ER | 1 184 982 A1 | 3/2002 |
| WO | 2016/171512 A1 | 10/2016 |
| WO | 2017/207634 A1 | 12/2017 |

OTHER PUBLICATIONS

Written Opinion for PCT/EP2019/062977 dated Aug. 5, 2019 [PCT/ISA/237].
Swiss Search Report for CH 6832018 dated Sep. 4, 2018.
Translation of Office Action dated Sep. 1, 2021 from the China National Intellectual Property Administration in CN Application No. 201980035913.8.

\* cited by examiner

METHOD AND A MOBILE COMMUNICATION DEVICE FOR CONTROLLING AN HVAC COMPONENT IN A BUILDING

TECHNICAL FIELD

The invention relates to a method and a mobile communication device for controlling an HVAC (Heating, Ventilation, and Air Conditioning) component in a building. Specifically, the present invention relates to a method and a mobile communication device for controlling a component of an HVAC system in a building, using the mobile communication device.

BACKGROUND OF THE INVENTION

HVAC systems often involve a plurality of HVAC components installed at different sites and locations of a facility or a building. Typically, the HVAC components, such as valves, dampers, pumps, ventilators, heaters, chillers, heat exchangers, actuators, and sensors, thermostats, etc. are each controllable and exhibit varying states and operating conditions depending on operation and performance of the HVAC component. For monitoring, controlling and maintenance purposes, it is therefore desired to obtain fast and efficient information on the status of an HVAC component and to define and set operating parameters (setpoints) for controlling the HVAC components in an HVAC system.

For regulating the operation of HVAC systems, remotely located central control systems, such as Building Automation Systems are typically used. However, on-site maintenance is regularly required, where field workers often face uncertainty about the location and identification of a particular HVAC component among the plurality of HVAC components in the HVAC system. More often than not, HVAC components are installed in places with limited or barred accessibility which further impedes fast localization, identification, status verification, and/or control of the HVAC components. For example, an HVAC component may be installed in a location separated by a barrier from the field worker, e.g. within a duct or behind a wall, a raised floor or a lowered ceiling, where they are not easily accessible or at least not visible to a field worker. Additionally, the HVAC component may be placed in an orientation where control elements on the HVAC components are difficult to activate manually. Therefore, ease of access for controlling operation of the HVAC components is likewise desired.

SUMMARY OF THE INVENTION

It is an object of the invention to provide a method and a mobile communication device for controlling an HVAC component in a building, which method and device at least partially improve the prior art for controlling an HVAC component of an HVAC system in a building.

According to the present invention, these objects are achieved by the features of the independent claims. In addition, further advantageous embodiments follow from the dependent claims and the description.

According to an aspect of the invention, these objects are particularly achieved by a method of controlling an HVAC component in a building, whereby the method comprises: arranging a physical identifier object, which is associated with the HVAC component, in a room of the building in an area with access to a wireless network and at a location distant and separated from the HVAC component; determining, by a circuit of a mobile communication device, identifier information from the physical identifier object; transmitting, by the circuit of the mobile communication device, the identifier information via the wireless network to a remote computer system; receiving, by the circuit of the mobile communication device, from the remote computer system via the wireless network HVAC component data linked to the identifier information; generating and rendering, by the circuit of the mobile communication device, on a display of the mobile communication device, a component user interface of an HVAC virtual room unit for controlling the HVAC component, using the HVAC component data; receiving, by the circuit of the mobile communication device, from a user of the mobile communication device a user command for controlling the HVAC component via the component user interface; transmitting, by the circuit of the mobile communication device, the user command for the HVAC component via the wireless network to the remote computer system; and transmitting, by the remote computer system, to the HVAC component via a communication network a control command corresponding to the user command, for controlling the HVAC component.

In an embodiment, the method further comprises the circuit of the mobile communication device receiving from the remote computer system via the wireless network HVAC system data including HVAC component data for a plurality of HVAC components in the building, prior to determining the identifier information; and the circuit of the mobile communication device determining from the HVAC system data the component data linked to the identifier information, after determining the identifier information, if the remote computer system is not accessible for the mobile communication device via the wireless network.

In an embodiment, transmitting the user command for the HVAC component to the remote computer system comprises the circuit of the mobile communication device storing the user command for the HVAC component in a data store of the mobile communication device, in case the remote computer system is not accessible for the mobile communication device via the wireless network, and subsequently transmitting the user command from the data store to the remote computer system, when the remote computer system is accessible to the mobile communication device via a wireless network.

In an embodiment, the method further comprises the circuit of the mobile communication device indicating to the user of the mobile communication device via the component user interface of the HVAC virtual room unit that the user command for the HVAC component has been stored for later transmission, and indicating to the user when the user command has been subsequently transmitted from the data store to the remote computer system.

In an embodiment, the method further comprises the circuit of the mobile communication device receiving from the HVAC component via a wireless communication interface component data; displaying at least some of the component data received from the HVAC component in the component user interface of the HVAC virtual room unit; and transmitting at least some of the component data received from the HVAC component via the wireless network to the remote computer system.

In an embodiment, the method further comprises the circuit of the mobile communication device generating a registration request for the HVAC virtual room unit, the registration request comprising the identifier information determined from the physical identifier object and a component identifier of the HVAC component, location information related to the HVAC component, a room identifier of the room, and/or location information related to the room; transmitting the registration request via the wireless network to the remote computer system; and receiving from the remote computer system a confirmation message confirming the registration of the physical identifier object as an identifier of the HVAC virtual room unit assigned to the HVAC component.

In an embodiment, generating and rendering the component user interface comprises generating and rendering user interface elements for displaying at least some of the component data, the component data including status information of the HVAC component, and user interface elements for controlling operation of the HVAC component, the HVAC component including a heater, a chiller, a heat exchanger, a pump, a ventilator, an actuator, a valve, a damper, and/or a sensor.

In an embodiment, arranging the physical identifier object comprises arranging a visual marker associated with the HVAC component and/or arranging an RFID tag (Radio Frequency Identifier) associated with the HVAC component; determining the identifier information from the physical identifier object comprises the circuit of the mobile communication device respectively performing: using a camera of the mobile communication device to detect the visual marker and/or using an RFID reader of the mobile communication device to read the identifier information from the RFID tag; and transmitting the identifier information comprises the circuit of the mobile communication device respectively transmitting: an image of the visual marker, identifier information extracted from the visual marker, and/or the identifier information read from the RFID tag.

In addition to the method of controlling an HVAC component in a building, the present invention also relates to a mobile communication device comprising a display, and one or more circuits connected to the display and configured to perform the following steps: determining identifier information from a physical identifier object associated with an HVAC component in a building, the physical identifier object being arranged in a room of the building in an area with access to a wireless network and at a location distant and separated from the HVAC component; transmitting the identifier information via the wireless network to a remote computer system; receiving from the remote computer system via the wireless network HVAC component data linked to the identifier information; generating and rendering on the display a component user interface of an HVAC virtual room unit for controlling the HVAC component, using the HVAC component data; receiving from a user of the mobile communication device a user command for controlling the HVAC component via the component user interface; and transmitting the user command for the HVAC component via the wireless network to the remote computer system, enabling the remote computer system to control the HVAC component by transmitting to the HVAC component via a communication network a control command corresponding to the user command for the HVAC component.

In an embodiment, the one or more circuits are further configured to receive from the remote computer system via the wireless network HVAC system data including HVAC component data for a plurality of HVAC components in the building, prior to determining the identifier information; and to determine from the HVAC system data the component data linked to the identifier information, after detecting the identifier information, if the remote computer system is not accessible for the mobile communication device via the wireless network.

In an embodiment, the one or more circuits are further configured to store the user command for the HVAC component in a data store of the mobile communication device, in case the remote computer system is not accessible for the mobile communication device via the wireless network, and to subsequently transmit the user command from the data store to the remote computer system, when the remote computer system is accessible to the mobile communication device via the wireless network.

In an embodiment, the one or more circuits are further configured to indicate to the user of the mobile communication device via the component user interface of the HVAC virtual room unit that the user command for the HVAC component has been stored for later transmission, and to indicate to the user when the user command has been subsequently transmitted from the data store to the remote computer system.

In an embodiment, the mobile communication device further comprises a wireless communication interface; and the one or more circuits are further configured to receive from the HVAC component via the wireless communication interface component data, to display at least some of the component data received from the HVAC component in the component user interface of the HVAC virtual room unit, and to transmit at least some of the component data received from the HVAC component via the wireless network to the remote computer system.

In an embodiment, the one or more circuits are further configured to generate a registration request for the HVAC virtual room unit, the registration request comprising the identifier information determined from the physical identifier object and a component identifier of the HVAC component, location information related to the HVAC component, a room identifier of the room, and/or location information related to the room; to transmit the registration request via the wireless network to the remote computer system; and to receive from the remote computer system a confirmation message confirming the registration of the physical identifier object as an identifier of the HVAC virtual room unit assigned to the HVAC component.

In an embodiment, the one or more circuits are further configured to generate and render the component user interface by generating and rendering user interface elements for displaying at least some of the component data, the component data including status information of the HVAC component, and user interface elements for controlling operation of the HVAC component, the HVAC component including: a heater, a chiller, a heat exchanger, a pump, a ventilator, an actuator, a valve, a damper, and/or a sensor.

In an embodiment, the mobile communication device further comprises a camera and/or an RFID reader; and the one or more circuits are further configured to determine the identifier information respectively by performing: using the camera to detect a visual marker provided on the physical identifier object, and/or using the RFID reader to read the identifier information from an RFID tag provided with the physical identifier object; and to transmit the identifier information by transmitting: an image of the visual marker, identifier information extracted from the visual marker, and/or the identifier information read from the RFID tag.

In addition to the method of controlling an HVAC component in a building and the mobile communication device, the present invention also relates to a computer program product comprising a non-transitory computer-readable medium having stored thereon computer code configured to control one or more processors of a mobile communication device, such that the one or more processors perform the following steps: determining identifier information from a physical identifier object associated with an HVAC component in a building and arranged in a room of the building in an area with access to a wireless network and at a location distant and separated from the HVAC component; transmitting the identifier information via a wireless network to a remote computer system; receiving from the remote computer system via the wireless network HVAC component data linked to the identifier information; generating and rendering on a display of the mobile communication device a component user interface of an HVAC virtual room unit for controlling the HVAC component, using the HVAC component data; receiving from a user of the mobile communication device a user command for controlling the HVAC component via the component user interface; and transmitting the user command for the HVAC component via the wireless network to the remote computer system, enabling the remote computer system to control the HVAC component by transmitting to the HVAC component via a communication network a control command corresponding to the user command for the HVAC component.

According to a further aspect, the present invention is also directed to a method of controlling a particular HVAC component in a building, whereby the method comprises: a circuit of a mobile communication device receiving from a remote computer system via a wireless network HVAC system data including HVAC component data for a plurality of HVAC components in the building; determining, by the circuit of the mobile communication device, identifier information from a physical identifier object which is associated with the particular HVAC component; in case of the remote computer system being not accessible for the mobile communication device via the wireless network, the circuit of the mobile communication device determining from the HVAC system data the component data linked to the identifier information, and otherwise, transmitting, by the circuit of the mobile communication device, the identifier information via a wireless network to the remote computer system and receiving from the remote computer system via the wireless network HVAC component data linked to the identifier information; generating and rendering, by the circuit of the mobile communication device, on a display of the mobile communication device a component user interface of an HVAC virtual room unit for controlling the particular HVAC component, using the HVAC component data; receiving, by the circuit of the mobile communication device, from a user of the mobile communication device a user command for controlling the particular HVAC component via the component user interface; in case of the remote computer system being not accessible for the mobile communication device via the wireless network, the circuit of the mobile communication device storing the user command for the particular HVAC component in a data store of the mobile communication device for subsequent transmission of the user command, when the remote computer system is accessible to the mobile communication device via the wireless network; in case of the remote computer system being accessible for the mobile communication device via the wireless network, the circuit of the mobile communication device transmitting the user command for the particular HVAC component via the wireless network to the remote computer system; and the remote computer system transmitting via a communication network to the particular HVAC component a control command corresponding to the user command, for controlling the particular HVAC component.

In addition to the method of controlling a particular HVAC component in a building according to the further aspect, the present invention also relates to a mobile communication device comprising a display, and one or more circuits connected to the display and configured to perform the following steps: receiving from a remote computer system via a wireless network HVAC system data including HVAC component data for a plurality of HVAC components in the building; determining identifier information from a physical identifier object which is associated with the particular HVAC component; in case of the remote computer system being not accessible for the mobile communication device via the wireless network, determining from the HVAC system data the component data linked to the identifier information, and otherwise, transmitting the identifier information via a wireless network to the remote computer system and receiving from the remote computer system via the wireless network HVAC component data linked to the identifier information; generating and rendering on the display a component user interface of an HVAC virtual room unit for controlling the particular HVAC component, using the HVAC component data; receiving from a user of the mobile communication device a user command for controlling the particular HVAC component via the component user interface; in case of the remote computer system being not accessible for the mobile communication device via the wireless network, storing the user command for the particular HVAC component in a data store of the mobile communication device for subsequent transmission of the user command, when the remote computer system is accessible to the mobile communication device via the wireless network; in case of the remote computer system being accessible for the mobile communication device via the wireless network, transmitting the user command for the particular HVAC component via the wireless network to the remote computer system, enabling the remote computer system to control the particular HVAC component by transmitting to the particular HVAC component via a communication network a control command corresponding to the user command for the particular HVAC component.

In addition to the mobile communication device and the method of controlling a particular HVAC component in a building according to the further aspect, the present invention also relates to a computer program product comprising a non-transitory computer-readable medium having stored thereon computer code configured to control one or more processors of a mobile communication device, such that the one or more processors perform the following steps: receiving from a remote computer system via a wireless network HVAC system data including HVAC component data for a plurality of HVAC components in the building; determining identifier information from a physical identifier object which is associated with the particular HVAC component; in case of the remote computer system being not accessible for the mobile communication device via the wireless network, determining from the HVAC system data the component data linked to the identifier information, and otherwise, transmitting the identifier information via a wireless network to the remote computer system and receiving from the remote computer system via the wireless network HVAC component data linked to the identifier information; generating and rendering on the display a component user interface of an HVAC virtual room unit for controlling the particular HVAC component, using the HVAC component data; receiving from a user of the mobile communication device a user command for controlling the particular HVAC component via the component user interface; in case of the remote computer system being not accessible for the mobile communication device via the wireless network, storing the user command for the particular HVAC component in a data store of the mobile communication device for subsequent transmission of the user command, when the remote computer system is accessible to the mobile communication device via the wireless network; in case of the remote computer system being accessible for the mobile communication device via the wireless network, transmitting the user command for the particular HVAC component via the wireless network to the remote computer system, enabling the remote computer system to control the particular HVAC component by transmitting to the particular HVAC component via a communication network a control command corresponding to the user command for the particular HVAC component.

It should be pointed out, that the further aspect of the invention requires that the physical identifier object is accessible to a sensor of the mobile communication device for obtaining the identifier information from the physical identifier object, e.g. visible to a camera of the mobile communication device or within a communication range of an RFID reader of the mobile communication device; however, the further aspect of the invention does not require that the physical identifier object is arranged at a location distant and separated from the particular HVAC component to be controlled—the physical identifier object may actually be arranged on or in the particular HVAC component; moreover, the further aspect of the invention does not require that the physical identifier object is arranged in a room of the building in an area with access to the wireless network.

BRIEF DESCRIPTION OF THE DRAWINGS

The present invention will be explained in more detail, by way of example, with reference to the drawings, in which.

DETAILED DESCRIPTION OF EXEMPLARY EMBODIMENTS

Figure 1:
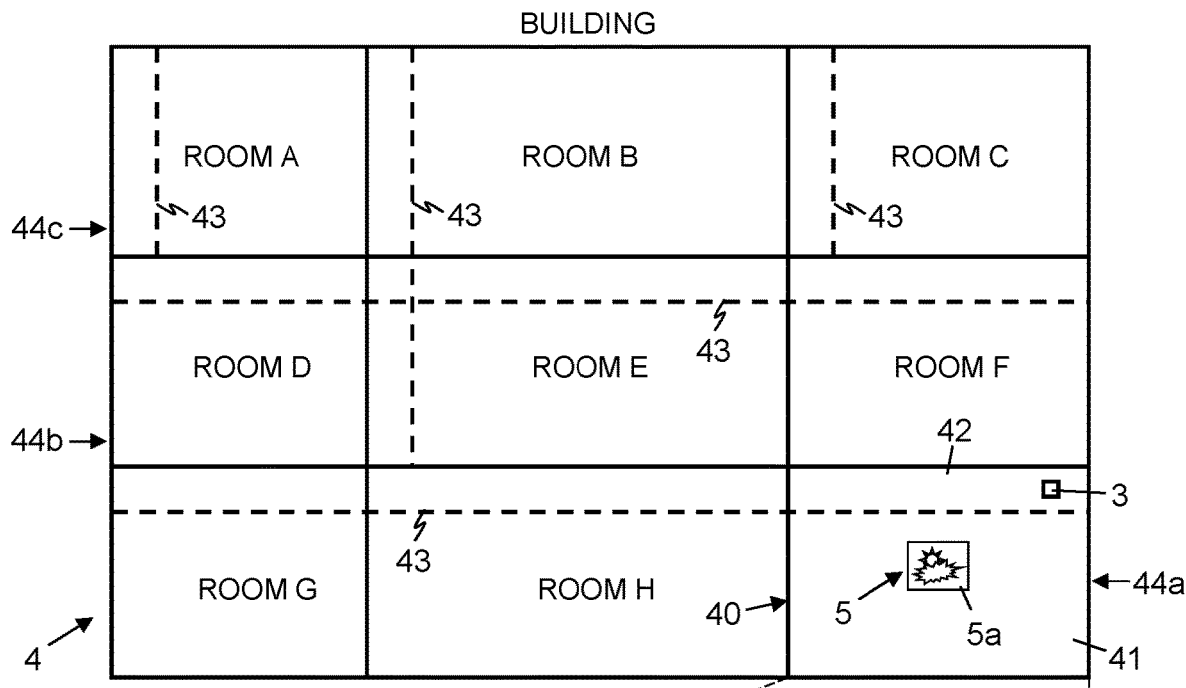
FIG. 1: shows a schematic cross section of an exemplary building with several rooms and several floors, where an HVAC component associated with a particular room is arranged at a location with barred accessibility for a field worker in the particular room, and a physical identifier object with a visual marker associated with the HVAC component is arranged in the particular room at a location with non-barred accessibility for the field worker.
Figure 3:
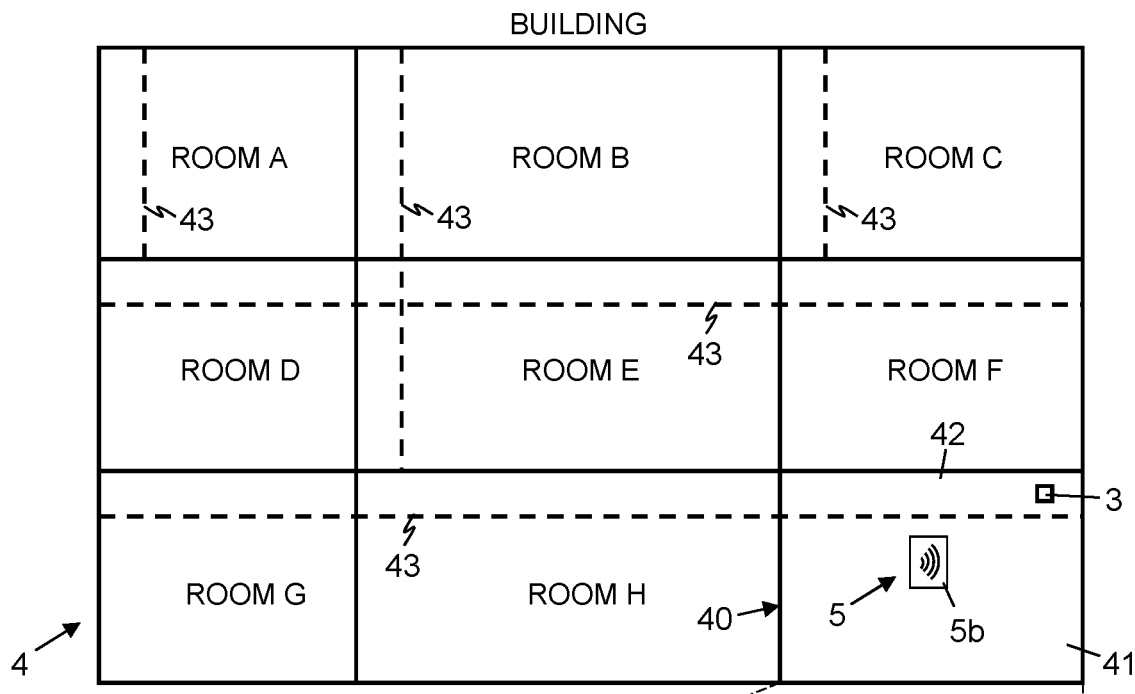
FIG. 3: shows a schematic cross section of an exemplary building with several rooms and several floors, where an HVAC component associated with a particular room is arranged at a location with barred accessibility for a field worker in the particular room, and a physical identifier object with an RFID tag associated with the HVAC component is arranged in the particular room at a location with non-barred accessibility for the field worker.

FIGS. 1 and 3 show schematic cross sections of a building 4 with several rooms 40 on several floors 44a, 44b, 44c.

As illustrated in FIGS. 1-5, the rooms comprise barriers 43, e.g. fluid (air) ducts, fluid (water) pipes, raised floors, lowered ceilings, and/or wall coverings, which define spaces 42 in the rooms 40 which have restricted or barred access for a field worked in the room 40. As further illustrated in the examples of FIGS. 1-5, at least some HVAC components 3 of an HVAC system which are associated with a particular room 40 are arranged in these spaces 42 with restricted accessibility for the field workers.

Depending on the configuration and/or implementation, the HVAC components 3 comprise valves, dampers, pumps, ventilators, heaters, chillers, heat exchangers, actuators, sensors, and other devices of an HVAC system. The sensors include sensors for measuring the temperature, flow rate, flow speed, (differential) pressure of a fluid in a duct (air) or a pipe (water) of the HVAC system, and/or the air temperature and/or other air quality values of air in or outside a room. The HVAC components 3 are characterized by respective component data, including a component type defining the type of the HVAC component 3, component status information defining the operational status and/or condition of the HVAC component 3, and/or component setpoints defining operational parameters for controlling operation of the HVAC component 3.

Figure 4:
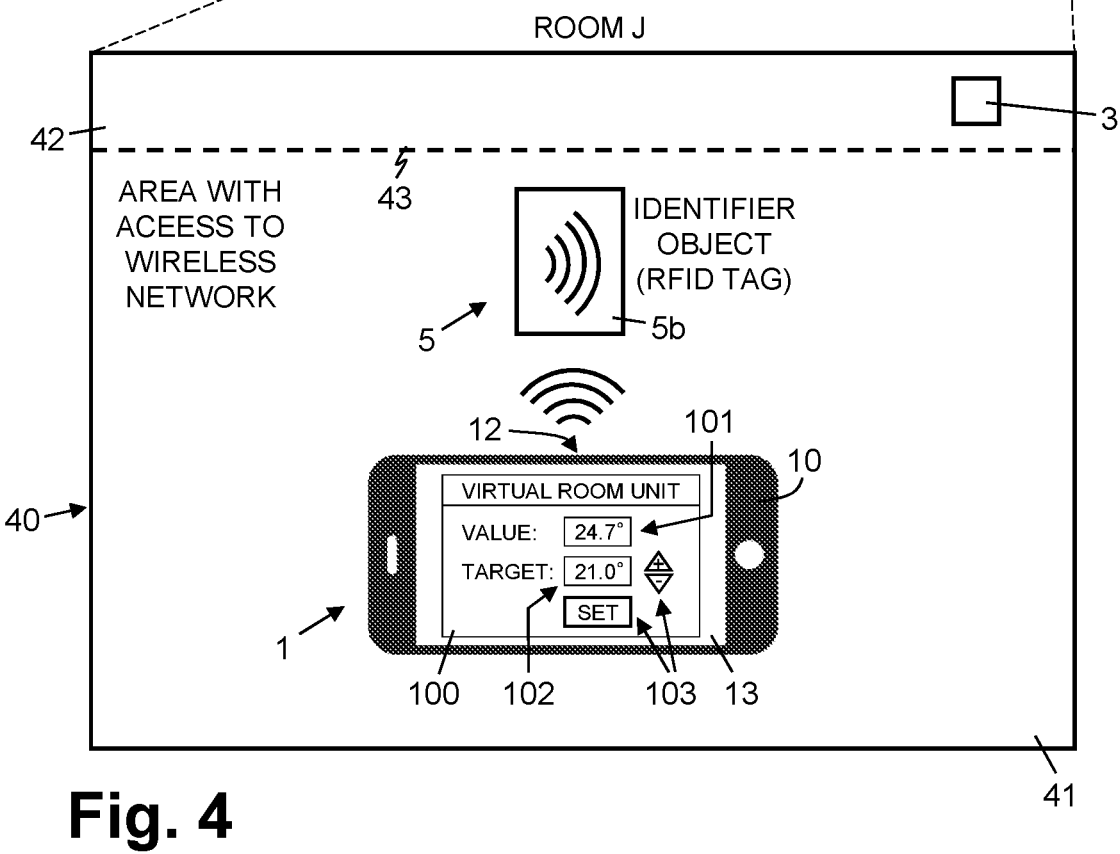
FIG. 4: shows a schematic cross section of an exemplary room of building with an HVAC system, where an HVAC component associated with the room is arranged at a location with barred accessibility for a field worker in the room, and a physical identifier object with an RFID tag associated with the HVAC component is arranged in the room at a location distant and separated from the HVAC component, in an area with non-barred accessibility for the field worker and with access to a wireless network for a mobile communication device in the room.
Figure 5:
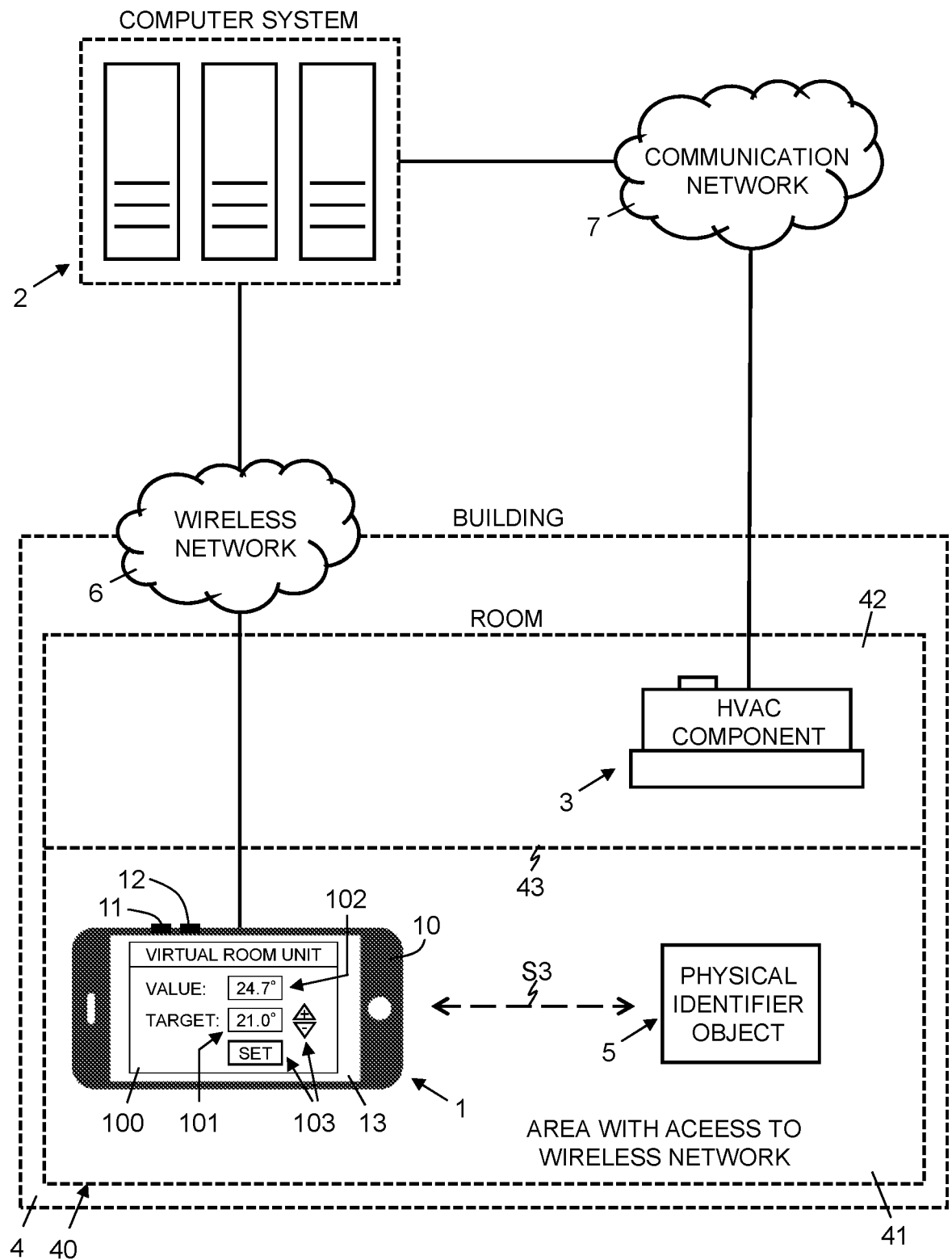
FIG. 5: shows a block diagram illustrating schematically a cross section of an exemplary room of building with an HVAC system, where an HVAC component associated with the room is arranged at a location with barred accessibility for a field worker in the room, and a physical identifier object associated with the HVAC component is arranged in the room at a location distant and separated from the HVAC component, in an area with access to a wireless network, enabling a mobile communication device in the room to control the HVAC component, defined by identifier information obtained from the physical identifier, via a remote computer system.

In FIGS. 1-5, reference numeral 5 refers to a physical identifier object associated with an HVAC component 3. In the examples of FIGS. 1-5, the physical identifier object 5 is arranged in the room 40 at a location distant and separated from the HVAC component 3, in an area 41 which is accessible to a field worker and which has access to a wireless network 6. In effect, the physical identifier object 5 is visible to the field worker and indicates to the field worker the location or area of or in the room 40 where a mobile communication device 1 can be used to access the wireless network 6, e.g. for exchanging data with a remote computer system 2, as illustrated in FIG. 5.

Figure 2:
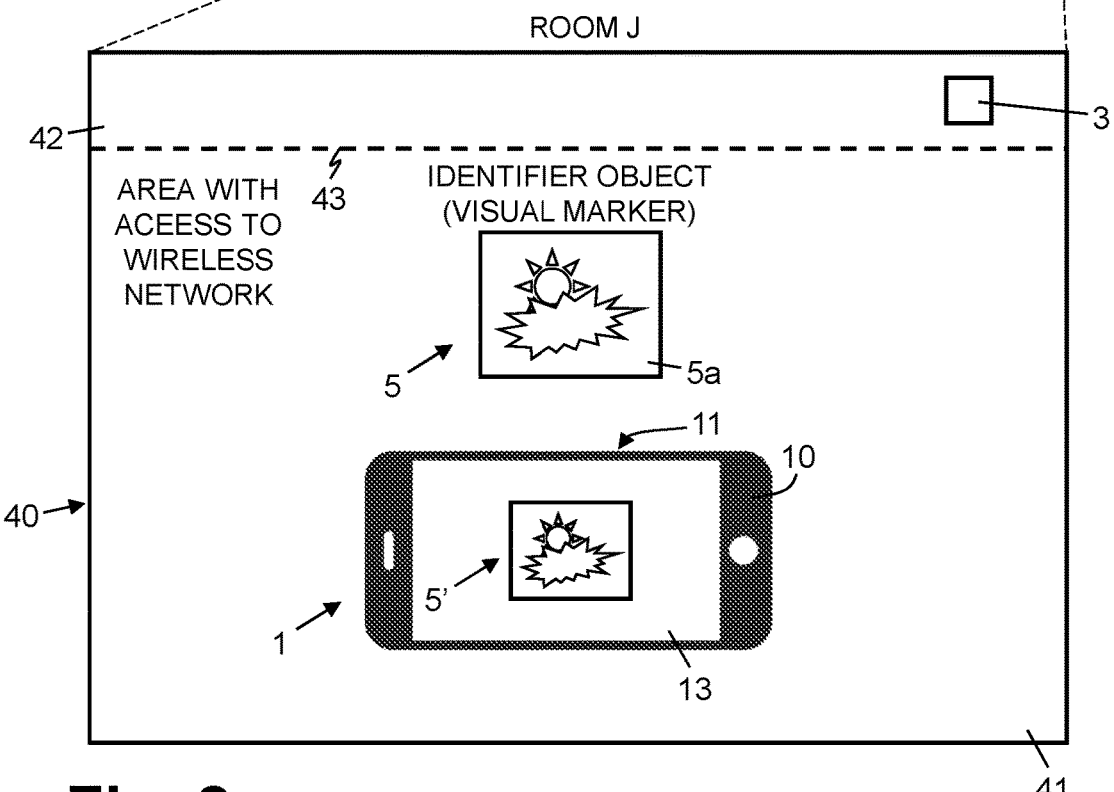
FIG. 2: shows a schematic cross section of an exemplary room of building with an HVAC system, where an HVAC component associated with the room is arranged at a location with barred accessibility for a field worker in the room, and a physical identifier object with a visual marker associated with the HVAC component is arranged in the room at a location distant and separated from the HVAC component, in an area with non-barred accessibility for the field worker and with access to a wireless network for a mobile communication device in the room.

Depending on the embodiment, the physical identifier object 5 comprises a visual marker 5a, as illustrated in FIGS. 1 and 2, and/or an RFID tag 5b, e.g. an NFC (Near Field Communication) tag. For example, the visual marker 5a comprises a QR (Quick Response) code, a bar code, or another visual code which represents (encodes) an identifier associated with the HVAC component 3, or the visual code 5a comprises a unique or at least a discernable image, which is associated with the HVAC component 3.

The mobile communication device 1 comprises a sensor for obtaining and determining identifier information from the physical identifier object 5, e.g. a camera 11, as illustrated in FIGS. 2 and 5, and/or an RFID reader 12, e.g. an NFC reader, as illustrated in FIGS. 4 and 5.

The wireless network 6 comprises a WLAN (Wide Area Local Network), a mobile radio network, e.g. a GSM (Global System for Mobile Communication), a UMTS (Universal Mobile Telecommunication System), or a 5G network, and/or another wireless communication network, for data communication with the remote computer system 2, e.g. via the Internet.

Accordingly, the mobile communication device 1 comprises a communication module for accessing and exchanging data with the remote computer system 2 via the wireless network 6.

The mobile communication device 1 also comprises a display 13, particularly a display with a touch-sensitive screen for implementing touch-sensitive user interfaces, and an electronic circuit 10, connected to the display 13, the camera 11, and/or the RFID reader 12, respectively. The electronic circuit 10 comprises a programmable processor, an ASIC (Application Specific Integrated Circuit), and/or another electronic circuit configured to perform various functions and steps described later in more detail. In case of the electronic circuit 10 comprising a programmable processor, the mobile communication device 1 further comprises a computer-readable medium having stored thereon computer code configured to control the processor to perform the various functions and steps described later in more detail.

The mobile communication device 1 is implemented as a mobile radio phone (e.g. a cellular phone), particularly, a so called "smart phone", a "smart watch", a tablet computer, or the likes.

The remote computer system 2 comprises one or more operable computers with one or more processors, configured to perform various functions as described later in more detail. As is illustrated schematically in FIG. 5, the remote computer system 2 comprises a communication module configured to access and exchange data with the HVAC component 3 via a communication network 7. Depending on the implementation and scenario, the communication network 7 comprises a LAN (Local Area Network), a WLAN, and/or the Internet. In an embodiment, the remote computer system 2 is a cloud-based computer system.

Figure 6:
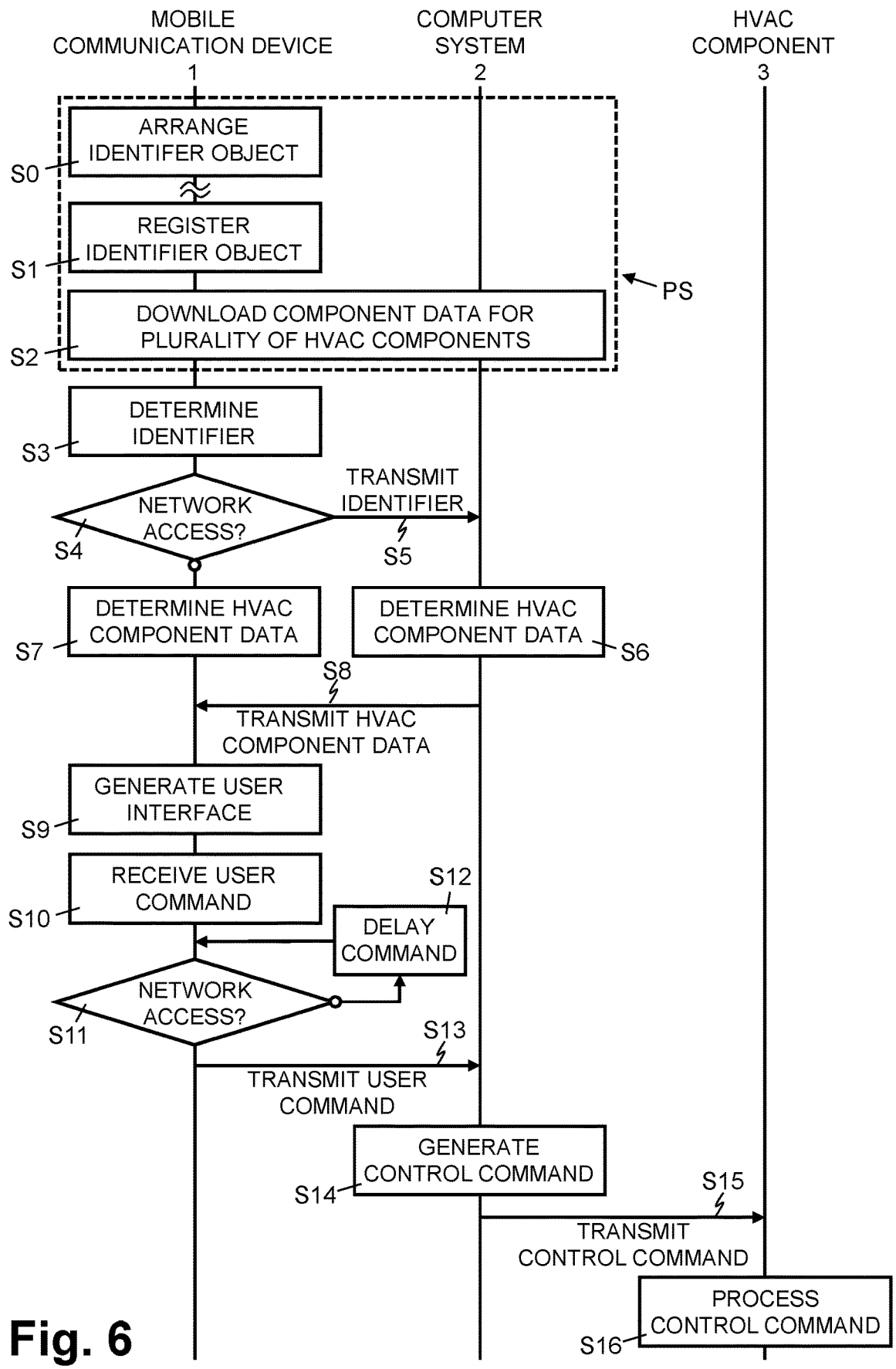
FIG. 6: shows a flow diagram illustrating an exemplary sequence of steps for controlling by a mobile communication device an HVAC component in a building, whereby the HVAC component is determined by a physical identifier object, arranged at a location distant and separated from the HVAC component.
Figure 7:
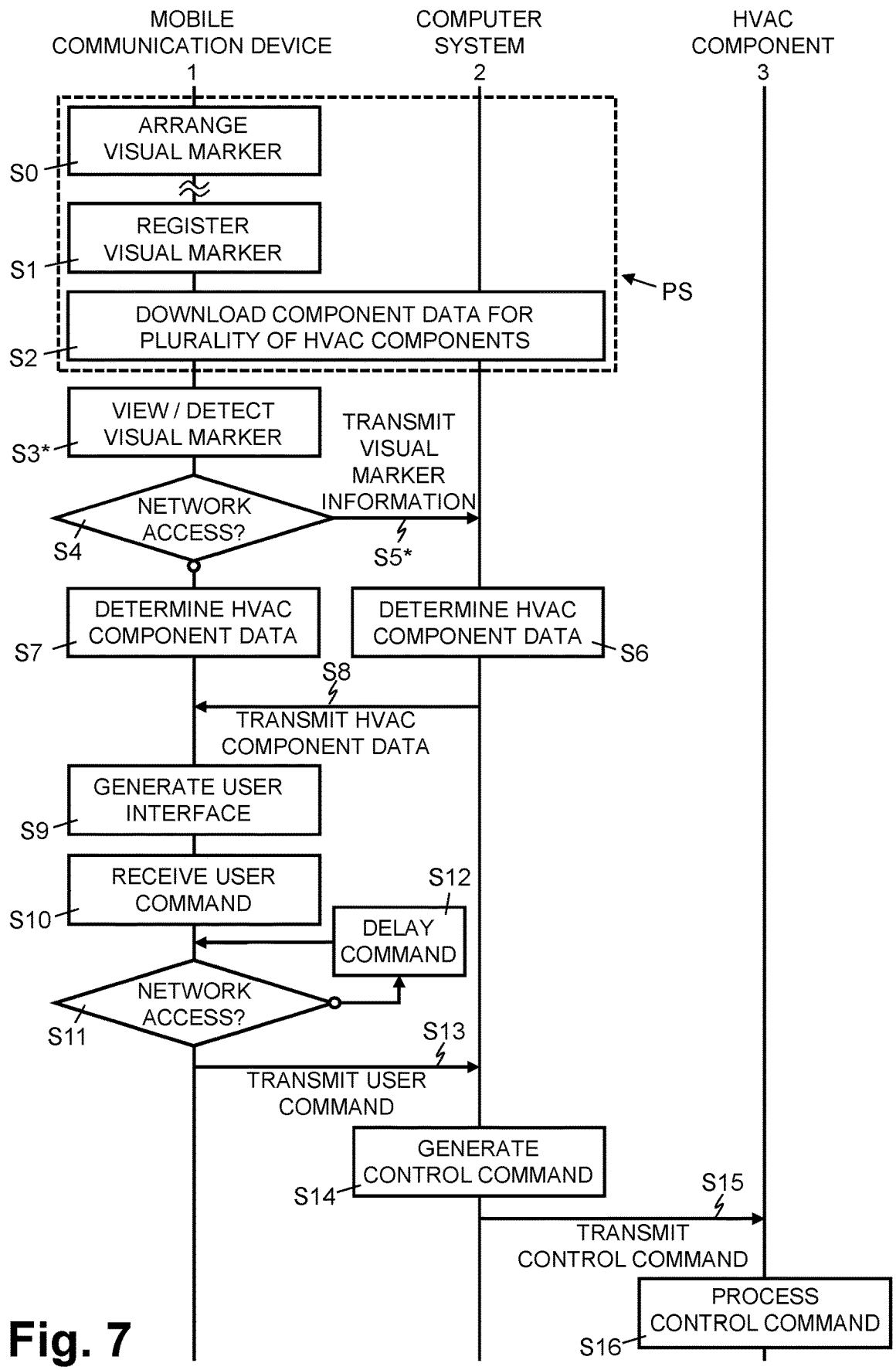
FIG. 7: shows a flow diagram illustrating an exemplary sequence of steps for controlling by a mobile communication device an HVAC component in a building, whereby the HVAC component is determined by a physical identifier object with a visual marker, arranged at a location distant and separated from the HVAC component.

In the following paragraphs, described with reference to FIGS. 6 and 7 are possible sequences of steps performed by the mobile communication device 1, the remote computer system 2, the HVAC component(s) 3, and/or their respective circuits 10 or processors, respectively, for controlling an HVAC component 3 in a building 4.

In FIGS. 6 and 7, reference numeral PS refers to a block of preparatory steps S0, S1 and S2.

In preparatory step S0, a physical identifier object 5 related to an HVAC component 3 is arranged in a room 40 of a building 4. According to a first aspect of the invention, the physical identifier object 5 is arranged in the room 40 at a location distant and separated from the HVAC component 3, in an area 41 which is accessible to a field worker (user) and which provides to the mobile communication device 1 access to the wireless network 6. For example, the physical object identifier 5 is fixed to a wall or a floor of the respective room 40. As indicated in the introduction, in a further second aspect of the invention, the physical identifier object 5 may be placed on or in the HVAC component and does not have to be in an area with access to the wireless network 6.

In preparatory step S1, the physical identifier object 5 is registered with the remote computer system 2 as an identifier for an HVAC virtual room unit for controlling the HVAC component 3 and/or as an identifier for the HVAC component 3, respectively. Depending on the configuration of the HVAC component 3 and/or the method of commissioning the HVAC component 3, the order of steps S0 and S1 may be switched. In an embodiment, the physical identifier object 5 is registered on-site, using the mobile communication device 1 to transmit a registration request via the wireless network 6 to the remote computer system 2. The registration request includes the identifier information determined from the physical identifier object 5, i.e. identifier information read by the RFID reader 12 from the RFID tag 5b, as illustrated in FIG. 4, identifier information extracted from the visual marker 5a as viewed by the camera 11 or an image 5' of the visual marker 5a taken by the camera 11, as illustrated in FIG. 2. For associating the physical identifier object 5 with the HVAC component 3, the registration request further comprises component identification information, e.g. a component identifier of the HVAC component 3, a component type of the HVAC component 3, location information related to the HVAC component 3, a room identifier of the room 40, location information related to the room 40, and/or other component identification information enabling the remote computer system 2 to identify the HVAC component 3. Using the component identification information included in the registration request, the remote computer system 2 identifies the HVAC component 3 and stores the identifier information from the physical identifier object 5 linked to the HVAC component 3 or to its component identifier, respectively.

In step S2, e.g. prior to entering the building 4 or the room 40 where the HVAC component is installed, the field worker and user of the mobile communication device 1 downloads from the remote computer system 2, e.g. via the wireless network 6, HVAC systems information for the HVAC system of the building 4. The HVAC systems information includes HVAC component data for a plurality of HVAC components 3 in the building 4. More specifically, the HVAC component data for a particular HVAC component 3 includes the identifier information from the physical identifier object 5 linked to the HVAC component 3, the component identifier, the component type, the component status information, and/or the component setpoints of the particular HVAC component 3, as outlined above. The downloaded HVAC systems information is stored in the mobile communication device 1 for future reference, for example, for cases when current component information is not available on-site from the remote computer system 2, e.g. because of inaccessibility of the wireless network 6 at the specific on-site location, because of communication or network failure or overload, or because of other reasons for non-availability of the remote computer system 2.

In step S3 or S3*, respectively, the identifier information is determined on-site from the physical identifier object 5. Depending on the embodiment or configuration, the field worker or user uses the mobile communication device 1 to obtain the identifier information from the physical identifier object 5 by viewing a visual marker 5a, using the camera 11 of the mobile communication device 1, as depicted by step S3* in FIG. 7, and/or by reading an RFID tag 5b using the RFID reader 12 of the mobile communication device 1. In case of a visual marker 5a, the mobile communication device 1 or its electronic circuit 10, respectively, stores an image 5' of the visual marker 5a or extracts the identifier information encoded in the visual marker 5a.

In step S4, the mobile communication device 1 or its electronic circuit 10, respectively, determines whether or not the remote computer system 2 is accessible via the wireless network 6. If the wireless network 6 and the remote computer system 6 are accessible, processing continues in step S5 (FIG. 6) or S5* (FIG. 7), respectively; otherwise, processing continues in step S7.

In step S5 or S5*, respectively, the mobile communication device 1 or its electronic circuit 10, respectively, transmits the identifier information or visual marker information via the wireless network 6 to the remote computer system 2. More specifically, the identifier information read from the RFID tag 5b, the identifier information extracted from the visual marker 5a, and/or the image taken from the visual marker 5a are transmitted from the mobile communication device via the wireless network to the remote computer system 2.

In step S6, the remote computer system 2 uses the received identifier information or visual marker information, respectively, to determine the component data linked to the HVAC component 3 defined by the received identifier information or visual marker information.

In step S8, the remote computer system 2 transmits the component data determined for the HVAC component 3 via the wireless network 6 to the mobile communication device 1.

Alternatively, in step S7, the mobile communication device 1 or its electronic circuit 10, respectively, determines the component data linked to the HVAC component 3 defined by the identifier information or visual marker information, respectively, from the stored HVAC system downloaded and stored in the mobile communication device 1, previously in step S2.

In step S9, the mobile communication device 1 or its electronic circuit 10, respectively, generates and renders on the display 13 a user interface of a virtual room unit 100 for controlling the HVAC component 3, using the component data received in step S6 or determined in step S7, respectively. Depending on the embodiment, the user interface of the virtual room unit 100 is generated or selected depending on the component type of the HVAC component 3 as determined by the component data for the HVAC component 3, or the component data comprises executable user interface code for the user interface of the virtual room unit 100 for the specific HVAC component 3 or its component type, respectively.

In an embodiment of the further second aspect of the invention, in case the physical identifier object 5 is placed on the HVAC component 3 as a visual marker 5a which is viewed in step S3* using the camera 11 of the mobile communication device 1, the user interface of the virtual room unit 100 is rendered on the display 13 as augmented reality overlaid over the HVAC component 3 viewed by the camera 11, using the component data received in step S6 or determined in step S7, respectively. In a further embodiment, in the case where the remote computer system 2 is not accessible via the wireless network 6 when the visual marker 5a is viewed with the camera 11, an image of the visual marker 5a is stored in the mobile communication device 1, and the user interface of the virtual room unit 100 is rendered on the display 13 as augmented reality overlaid over the stored image of the HVAC component 3, at a later point in time, when the remote computer system 2 is accessible for the mobile communication device 1 via the wireless network 6, using component data received from the remote computer system 2.

As illustrated in FIGS. 4 and 5, the user interface of the virtual room unit 100 for controlling the HVAC component 3 comprises user interface elements 101 for displaying at least some of the component data, particularly component status information related to the operational status and/or condition of the HVAC component 3 (position, flow rate, flow speed, differential pressure of valves or dampers; flow rate, flow speed, speed and driving power of pumps or ventilators; flow rate, temperature settings, entry and exit temperatures of fluid entering and exiting heaters, chillers, or heat exchangers; speed and position of actuators; measurement values of sensors; etc.); interface elements 102 for displaying and entering operational parameters for controlling operation of the HVAC component 3, e.g. setpoints for the HVAC component 3 (target position and flow rate for valves and dampers; target speed and driving power for pumps and ventilators; temperature settings for heaters, chillers, and heat exchangers; target speed and position for actuators; calibration values for sensors; etc.); and user interface elements 103 for controlling and navigating the user interface of the virtual room unit 100, e.g. menus, navigational icons ("UP", "DOWN", "LEFT", "RIGHT", "RETURN"), and/or command buttons ("OK", "SET", EXIT, etc.).

In step S10, the mobile communication device 1 or its electronic circuit 10, respectively, receives the user commands from the field worker or user of the mobile communication device 1 via the user interface of the virtual room unit 100 for controlling the HVAC component 3, for example via the touch-sensitive display 13 of the mobile communication device 1. The user commands, include commands for navigating the user interface of the virtual room unit 100 and commands for controlling operation and performance of the HVAC component 3, e.g. entry of values for specific target setpoints.

In step S11, the mobile communication device 1 or its electronic circuit 10, respectively, determines whether or not the remote computer system 2 is accessible via the wireless network 6. If the wireless network 6 and the remote computer system 6 are accessible, processing continues in step S13; otherwise, processing continues in step S12.

In step S12, the mobile communication device 1 or its electronic circuit 10, respectively, stores the received user command for subsequent (delayed) transmission to the remote computer system 2, once the remote computer system 2 is accessible via the wireless network 6. In an embodiment, the user interface is informed via an indication in the user interface of the virtual room unit 100 about the postponed or delayed transmission of the user command transmission.

In step S13, when the remote computer system 2 is accessible via the wireless network 6, the mobile communication device 1 or its electronic circuit 10, respectively, transmits the received/stored user command via the wireless network 6 to the remote computer system 2. The user command comprises the component identifier of the HVAC component 3, the identifier information of the physical identifier object 5, a command type, and/or values of operational parameters to be transferred to the HVAC component 3.

In step S14, the remote computer system 2 receives the user command from the mobile communication device 1 and generates a corresponding control command for the HVAC component 3.

In step S15, the remote computer system 2 transmits the control command via the communication network 7 to the HVAC component 3.

In step S16, the HVAC component 3 receives and processes the control command from the remote computer system 2. Specifically, the HVAC component 3 sets commanded setpoints and operational modes.

It should be noted that, in the description, the sequence of the steps has been presented in a specific order, one skilled in the art will understand, however, that the order of at least some of the steps could be altered, without deviating from the scope of the invention, for example, steps S0 and S1 illustrated in FIGS. 6 and 7 can be switched, as explained above.

The invention claimed is:

1. A method of controlling an HVAC component in a building, the method comprising:
arranging a physical identifier object, which is associated with the HVAC component, in a room of the building in an area with access to a wireless network and at a location distant and separated from the HVAC component;
determining, by a circuit of a mobile communication device, identifier information from the physical identifier object;
transmitting, by the circuit of the mobile communication device, the identifier information via the wireless network to a remote computer system;
receiving, by the circuit of the mobile communication device, from the remote computer system via the wireless network, HVAC component data linked to the identifier information;
generating and rendering, by the circuit of the mobile communication device, on a display of the mobile communication device a component user interface of an HVAC virtual room unit for controlling the HVAC component, using the HVAC component data;
receiving, by the circuit of the mobile communication device, from a user of the mobile communication device a user command for controlling the HVAC component via the component user interface;
transmitting, by the circuit of the mobile communication device, the user command for the HVAC component via the wireless network to the remote computer system; and
transmitting, by the remote computer system, to the HVAC component via a communication network a control command corresponding to the user command, for controlling the HVAC component.

2. The method of claim 1, further comprising the circuit of the mobile communication device receiving from the remote computer system via the wireless network, HVAC system data including HVAC component data for a plurality of HVAC components in the building, prior to determining the identifier Information; and the circuit of the mobile communication device determining from the HVAC system data the component data linked to the identifier information, after determining the identifier information, if the remote computer system is not accessible for the mobile communication device via the wireless network.

3. The method of claim 1, wherein transmitting the user command for the HVAC component to the remote computer system comprises the circuit of the mobile communication device storing the user command for the HVAC component in a data store of the mobile communication device, in case the remote computer system is not accessible for the mobile communication device via the wireless network, and subsequently transmitting the user command from the data store to the remote computer system, when the remote computer system is accessible to the mobile communication device via a wireless network.

4. The method of claim 3, further comprising the circuit of the mobile communication device indicating to the user of the mobile communication device via the component user interface of the HVAC virtual room unit that the user command for the HVAC component has been stored for later transmission, and indicating to the user when the user command has been subsequently transmitted from the data store to the remote computer system.

5. The method of claim 1, further comprising the circuit of the mobile communication device generating a registration request for the HVAC virtual room unit, the registration request comprising the identifier information determined from the physical identifier object and at least one of the following: a component identifier of the HVAC component, location information related to the HVAC component, a room identifier of the room, and location information related to the room; transmitting the registration request via the wireless network to the remote computer system; and receiving from the remote computer system a confirmation message confirming the registration of the physical identifier object as an identifier of the HVAC virtual room unit assigned to the HVAC component.

6. The method of claim 1, wherein generating and rendering the component user interface comprises generating and rendering user interface elements for displaying at least some of the component data, the component data including status information of the HVAC component, and user interface elements for controlling operation of the HVAC component, the HVAC component including at least one of: a heater, a chiller, a heat exchanger, a pump, a ventilator, an actuator, a valve, a damper, and a sensor.

7. The method of claim 1, wherein arranging the physical identifier object comprises at least one of: arranging a visual marker associated with the HVAC component, and arranging an RFID tag associated with the HVAC component; determining the identifier information from the physical identifier object comprises the circuit of the mobile communication device respectively performing at least one of: using a camera of the mobile communication device to detect the visual marker, and using an RFID reader of the mobile communication device to read the identifier information from the RFID tag; and transmitting the identifier information comprises the circuit of the mobile communication device respectively transmitting at least one of: an image of the visual marker, identifier information extracted from the visual marker, and the identifier information read from the RFID tag.

8. A system comprising a mobile communication device and a physical identifier object associated with an HVAC component in a building,
wherein the physical identifier object is arranged in a room of the building in an area with access to a wireless network and at a location distant and separated from the HVAC component; and wherein the mobile communication device comprises a display, and one or more circuits connected to the display and configured to perform the following steps:

determining identifier information from the physical identifier object;

transmitting the identifier information via the wireless network to a remote computer system;

receiving from the remote computer system via the wireless network HVAC component data linked to the identifier information;

generating and rendering on the display a component user interface of an HVAC virtual room unit for controlling the HVAC component, using the HVAC component data;

receiving from a user of the mobile communication device a user command for controlling the HVAC component via the component user interface; and transmitting the user command for the HVAC component via the wireless network to the remote computer system, enabling the remote computer system to control the HVAC component by transmitting to the HVAC component via a communication network a control command corresponding to the user command for the HVAC component.

9. The system of claim 8, wherein the one or more circuits of the mobile communication device are further configured to receive from the remote computer system via the wireless network HVAC system data including HVAC component data for a plurality of HVAC components in the building, prior to determining the identifier information; and to determine from the HVAC system data the component data linked to the identifier information, after detecting the identifier information, if the remote computer system is not accessible for the mobile communication device via the wireless network.

10. The system of claim 9, wherein the one or more circuits of the mobile communication device are further configured to store the user command for the HVAC component in a data store of the mobile communication device, in case the remote computer system is not accessible for the mobile communication device via the wireless network, and to subsequently transmit the user command from the data store to the remote computer system, when the remote computer system is accessible to the mobile communication device via the wireless network.

11. The system of claim 10, wherein the one or more circuits of the mobile communication device are further configured to indicate to the user of the mobile communication device via the component user interface of the HVAC virtual room unit that the user command for the HVAC component has been stored for later transmission, and to indicate to the user when the user command has been subsequently transmitted from the data store to the remote computer system.

12. The system of claim 8, wherein the one or more circuits of the mobile communication device are further configured to generate a registration request for the HVAC virtual room unit, the registration request comprising the identifier information determined from the physical identifier object and at least one of the following: a component identifier of the HVAC component, location information related to the HVAC component, a room identifier of the room, and location information related to the room; to transmit the registration request via the wireless network to the remote computer system; and to receive from the remote computer system a confirmation message confirming the registration of the physical identifier object as an identifier of the HVAC virtual room unit assigned to the HVAC component.

13. The system of claim 8, wherein the one or more circuits of the mobile communication device are further configured to generate and render the component user interface by generating and rendering user interface elements for displaying at least some of the component data, the component data including status information of the HVAC component, and user interface elements for controlling operation of the HVAC component, the HVAC component including at least one of: a heater, a chiller, a heat exchanger, a pump, a ventilator, an actuator, a valve, a damper, and a sensor.

14. The system of claim 8, wherein the mobile communication device further comprises at least one of: a camera and an RFID reader; and the one or more circuits are further configured to determine the identifier information respectively by performing at least one of: using the camera to detect a visual marker provided on the physical identifier object, and using the RFID reader to read the identifier information from an RFID tag provided with the physical identifier object; and to transmit the identifier information by transmitting at least one of: an image of the visual marker, identifier information extracted from the visual marker, and the identifier information read from the RFID tag.

* * * * *